Patented Mar. 18, 1941

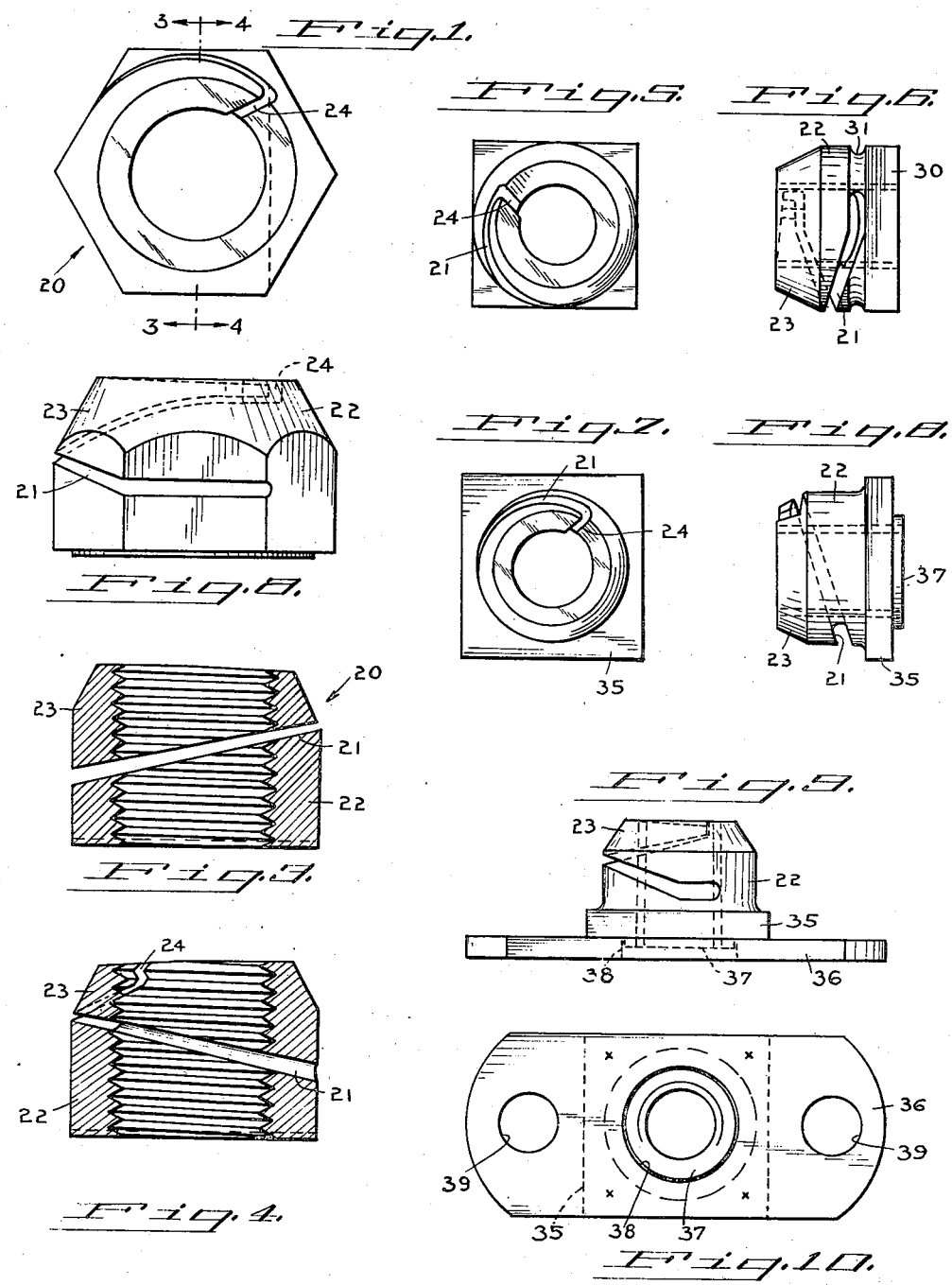

2,235,405

UNITED STATES PATENT OFFICE 2,235,405

GRIP NUT

Roscoe I. Markey, East Orange, N. J., assignor to Pollak Manufacturing Company, Arlington, N. J., a corporation of New Jersey Application December 17, 1938, Serial No. 246,374

3 Claims. (Cl. 151—21)

The invention relates to grip nuts.

The principal object of the invention is to provide a nut of exceedingly simple construction presenting substantial economies in manufacturing costs and one that will not back off or become accidentally displaced due to excessive vibration. In accordance with the invention the nut is of one piece construction and embodies an elastic element which encircles a portion of the threaded circumference.

Other objects and advantages will become apparent as this specification proceeds. Referring to the drawing forming a part thereof and in which several embodiments of the invention are illustrated:

Figs. 1, 2, 3, and 4 are respectively, a plan view, side elevation and sectional views of one form of nut;

Figs. 5 and 6 are respectively a plan view and side elevation of another form of nut;

Figs. 7 and 8 are respectively a plan view and side elevation of another form of nut;

Figs. 9 and 10 are respectively a side elevation and bottom plan view of the nut shown in Figs. 7 and 8 welded or otherwise secured to an attaching plate.

The invention is applicable to nuts of any size and any structural metal may be utilized in their construction. However, for the greatest efficiency in gripping and to prevent the nut from backing off or becoming accidentally displaced a material is preferably used having a high yield stress and low modulus of elasticity. The material should be strong and tough, having sufficient resiliency to permit of the bending and gripping action required, yet not be subject to permanent deformation by being used. It has been found in practice that high grade metal used in springs forms a good lock nut, as the nut as heretofore stated embodies an elastic element which forms a part thereof.

Referring again to the drawing and particularly to Figs. 1 to 4, the nut 20 has a transverse angularly disposed slot 21 extending across the nut for substantially more than one half the diameter thereof. This slot divides the nut into two portions one of which may be termed the body-portion 22 and the other an elastic element 23 which may be likened to or compared with a cantilever beam which has its base in the body-portion of the nut and is wrapped around the threaded area. The angle of the slot may be made steep enough so that it will run out at the top of the nut but as shown in Figs. 1 to 4 the angle of the slot is such that it terminates below the top of the nut. Thus in order to complete the cantilever beam or elastic element an additional slot 24 extending downwardly and inwardly is made. This slot is preferably not made radial in order to avoid any cutting tool action which would tend to destroy the finish of the nut.

As shown, particularly in Fig. 1, the beam 23 is bent with increasing curvature from its base to its tip. The radius of its threaded area at its base is that of the basic nut and the radius of the threaded area at its tip is less than that of the basic nut, thus bringing the gripping beam closer to the axis of the nut and thereby gripping the bolt onto which the nut is screwed in a most efficient manner.

The cantilever beam as shown in Figs. 2 and 3 is also preformed or distorted in an axial direction thus setting up an axial force. This distortion is accomplished by pressing the tip of the beam slightly downward and thus in effect narrowing the slot gradually from the base to the tip. The basic part of the nut resists this axial force and the radial force heretofore described and both contribute to the total gripping power of the nut.

The slot 21 is so disposed that the cantilever beam is reduced in cross section from its base to its tip thus equalling or approaching a tapered cantilever beam with constant stress throughout its length. By having or approaching constant stresss throughout the length of the gripping cantilever beam a maximum total gripping force is obtained.

From the foregoing it will be apparent that a nut having a cantilever beam or elastic element in which both radial and axial forces are set up to resist action of the nut backing off or becoming displaced is provided. In addition to these two sources of friction the one piece nut embodies a third which will cause a maximum gripping force to prevail. This third force is controlled by the direction of the wrap of the cantilever beam. The sliding frictional force exerted between the nut and the bolt lifts the curved beam off the bolt, thus reducing the total gripping force when the nut is turned around the bolt with the tip of the curved beam leading as would be the condition when threading the nut on a bolt. The maximum gripping force to resist rotation of the nut comes into effect when the base of the curved beam leads its tip as the benefit of direction of wrap is then obtained and the maximum frictional force is exerted between the nut and the bolt as when removing the nut from the bolt.

Referring to Figs. 5 and 6 the nut has all the characteristics described in connection with Figs. 1 to 4 as regards the curved cantilever beam and slot. The nut in these figures has a square base 30 and an annular groove 31 which cooperates with a mounting means.

The nut illustrated in Figs. 7 to 10 likewise has the curved cantilever beam 23 and slot 21. This nut is provided with a square base 35 which may be welded or otherwise secured to an attaching plate 36. A boss 37 may be formed on the under face of the nut for seating and positioning the nut in an opening 38 in the attaching plate. The attaching plate may be of various shapes and is provided with apertures 39 for securing means to position it. The nut may be secured to the attaching plate by spot welding applied at the points marked X in Fig. 10.

The actual amount of axial and radial preforming of the beam for efficient operation is very small and in the nut itself, particularly in smaller sizes is hardly discernible to the naked eye. For purpose of illustration the preforming has been exaggerated.

Changes in details of construction may be made by one skilled in the art without departing from the spirit of the invention as set forth in the appended claims.

I claim:

1. A grip nut having a diagonally extending slot crossing a plurality of threads and traversing approximately two thirds of the nut so as to form a curved cantilever beam which in expanded form has a longitudinal section of uniformly increasing depth, said slot being made in one cut by disposing the cutter angularly in relation to the nut, the radius of the threaded area at the base of the cantilever beam being that of the basic nut, said beam being deflected inwardly so that the radius of the threaded area at the tip of the cantilever beam is less than that of the basic nut so as to exert radial pressure, the beam being distorted axially by depressing it at its tip portion so as to exert axial pressure.

2. A one piece grip nut having a single diagonal slot formed therein, the slot crossing a plurality of threads and extending approximately two thirds of the way through the nut, and being made by disposing the cutter angularly in relation to the nut, another slot intercepting said first mentioned slot at its upper end so as to form a curved cantilever beam which in expanded form has a longitudinal section of uniformly increasing depth, the radius of the threaded area at the base of the cantilever beam being that of the basic nut, said beam being deflected inwardly so that the radius of the threaded area at the tip of the cantilever beam is less than that of the basic nut so as to exert radial pressure, the beam being distorted axially by depressing it at its tip portion so as to exert axial pressure.

3. A one piece grip nut having a single diagonally extending slot crossing a plurality of threads and traversing approximately two thirds of the nut so as to divide the nut into two portions, a body portion and a curved elastic element, the elastic element being tapered from its base to its tip or free end and bent with increasing curvature from its base to its tip so that the radius of the threaded area at its base is that of the basic nut and the radius of the threaded area at its tip is less than that of the basic nut, thus bringing the elastic element gradually closer to the axis of the nut so as to grip the bolt onto which the nut is screwed with approximately constant stress throughout its length, and the elastic element being distorted axially by depressing it at its tip portion so as to exert axial pressure, a grip nut thus being formed which in addition to radial and axial forces being set up to resist action of the nut backing off the bolt onto which it is screwed, a third force exists which is controlled by the direction of wrap of the elastic element, the sliding frictional forces exerted between the nut and the bolt lifting the curved elastic element off the bolt to reduce the total gripping force when the nut is turned around the bolt with the tip of the elastic element leading as would be the condition when threading the nut on a bolt, and the maximum gripping force to resist rotation of the nut coming into effect when the base of the elastic element leads its tip so that the benefit of direction of wrap is obtained and the maximum frictional force is exerted between the nut and the bolt when removing the nut from the bolt.

ROSCOE I. MARKEY.